March 24, 1942.      G. H. ORR      2,277,604
RUBBER TIRED WHEEL CONSTRUCTION
Filed Oct. 2, 1939
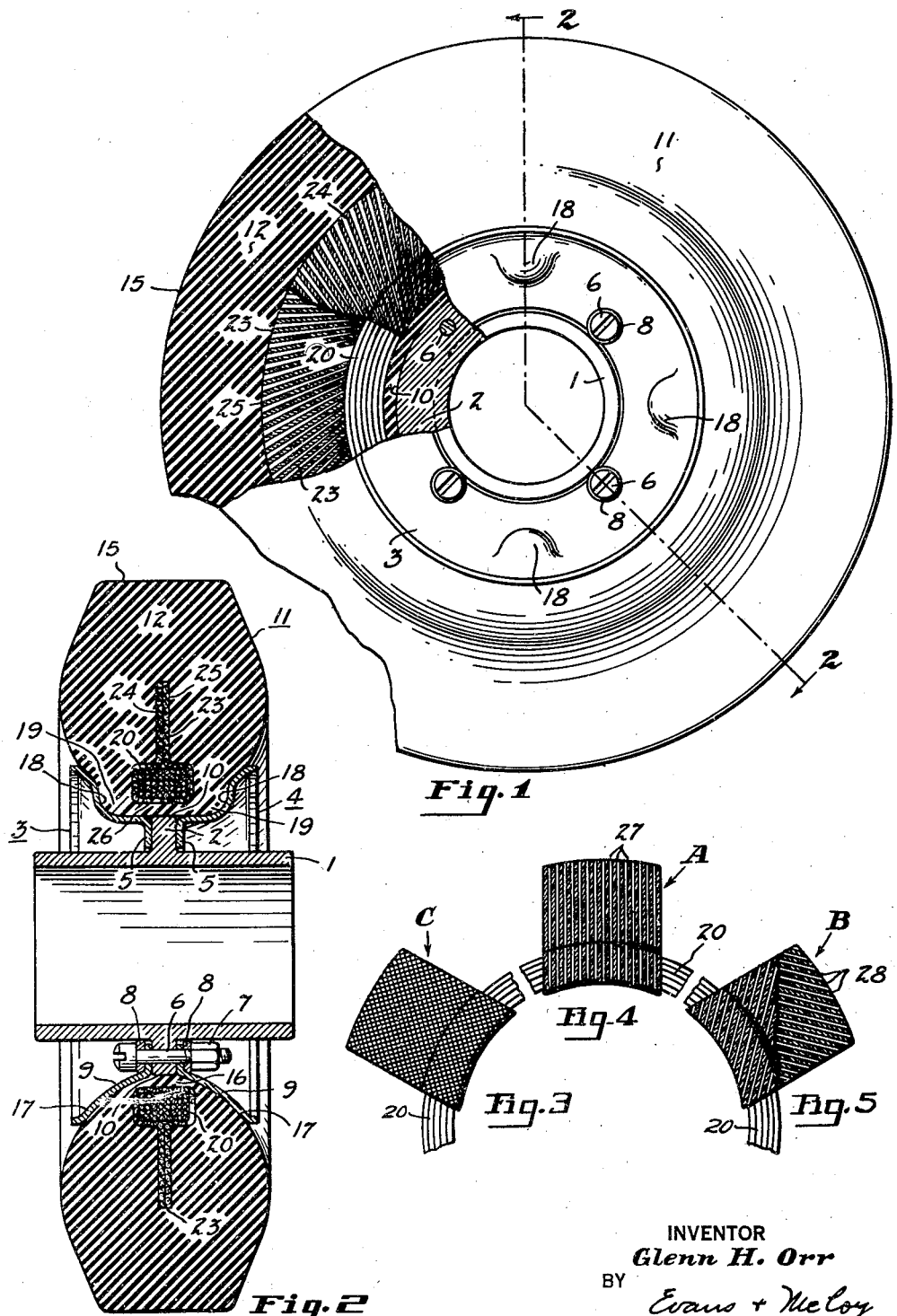
INVENTOR
*Glenn H. Orr*
BY
*Evans + McCoy*
ATTORNEYS Patented Mar. 24, 1942

2,277,604

UNITED STATES PATENT OFFICE 2,277,604

RUBBER TIRED WHEEL CONSTRUCTION

Glenn H. Orr, Akron, Ohio, assignor to The General Tire & Rubber Company, Akron, Ohio, a corporation of Ohio Application October 2, 1929, Serial No. 297,491

6 Claims. (Cl. 152—7)

This invention relates to wheels, more particularly to wheels having solid rubber cushion tires.

It is an object of the invention to provide a cushion tire having means incorporated therein to prevent dislodgment of the tire from a retaining wheel or rim.

Another object is to provide a tire and rim combination in which the tire has a bead to hold the tire on the rim of the wheel and means associated with the bead to reinforce the cushion body portion of the tire.

More specifically, the invention aims to provide in a tire and rim combination for a vehicle wheel, improved means for resisting circumferential movement of the tire about the rim and improved means for retaining the shape of the tire including a combined inextensible bead and a flexible reinforcing element.

A still further object of the invention is to provide an improved vehicle wheel which is simple in design and construction and relatively inexpensive to manufacture. Other objects and advantages will become apparent from the following detailed description of a suitable embodiment of the invention made in connection with the accompanying drawing, in which:

Figure 1 is an elevational view, partly in section and with parts broken away, showing my improved tire and wheel assembly;

Fig. 2 is a sectional view taken substantially on the line 2—2 of Fig. 1; and

Figs. 3 through 5 are fragmentary detail views, with parts broken away, showing modified constructions and arrangements of the inextensible bead and cord or fabric reinforcing elements.

In describing the invention reference is made to the drawing by numerals of reference which indicate like parts throughout the several views. The wheel comprises a hub 1 which may be mounted for rotation on a shaft or spindle, not shown, in the usual manner. Around the central portion of the hub 1 is secured or formed a radially extending flange or collar 2. The rim of the wheel is formed by a pair of circular ring members 3 and 4 which have radially inwardly extending circular flanges 5 disposed flatwise against the collar 2, preferably on opposite sides of the latter, and are secured in place by bolts 6 having nuts 7 and washers 8.

Adjacent the flanges 5 the rim members 3 and 4 are formed with substantially circular tire receiving portions 9 which extend away from one another in divergent relation substantially flush with outer face 10 of the collar 2 so as to provide an annular seat for the annular rubber tire indicated generally at 11. This tire comprises a cushion body portion 12 formed of resilient live rubber which is preferably compounded and vulcanized in the usual manner. The tire has an outer peripheral road engaging surface or tread portion 15 which may be substantially cylindrical and smooth, as shown, or may be provided with anti-skid formations well known in the trade. The tire 11, which is annular in extent, has an inner circumferentially extending edge portion 16 which is shaped to conform to the seat provided by the rim members 3 and 4 and the surface 10 of the collar 2. As appears in the lower half of Fig. 2, the rim members 3 and 4 extend radially outward from the collar 2 and overlie side portions 17 of the tire 11 so as to retain the tire on the rim.

At suitable intervals depressions or pockets 18 are formed in the flange portion 9 of the rim members 3 and 4 to receive in interlocking relation protuberances 19 formed on the tire 11 adjacent the inner edge 16 thereof. The protuberances 19 interfitting with the recesses 18 prevent relative rotational movement of the tire on the wheel or rim and yet do not interfere with the removal of the tire from the wheel for repair or replacement.

Embedded in the tire adjacent the inner edge portion 16 thereof and centrally disposed between the side wall surface 17 is an annular inextensible bead or core 20 which may be formed of a multiplicity of steel wires or the like, such, for example, as the bead wire employed in the manufacture of pneumatic vehicle tires. This core, while being wholly embedded within the body 12 of the tire, prevents distortion of the tire 11, thus preventing the latter from being dislodged from between the flange portions 9 of the rim members 3 and 4. As shown in Fig. 2, the diameter of the core or bead 20 is less than the diameter across the periphery of the rim flanges 9. Accordingly, the tire cannot be dislodged from the rim when subjected to lateral thrust since the core 20 is resiliently confined between the flanges 9 of the rim and resists distension of the tire which would permit the latter to pass laterally over the rim periphery.

In order to prevent excessive deformation of the tire under the influence of lateral thrusts, a reinforcing element 23 is employed. This element may be formed of cord material like that used in the manufacture of pneumatic vehicle tires. Preferably, the cords of the reinforcing element are embedded in rubber to form rubberized cord sheets or strips. These strips are then folded about the beads 20 so that the free ends of the individual cords indicated at 24 and 25 are disposed in side by side relation approximately in the plane of rotation of the wheel and tire and extend radially outwardly from the core to form a flexible laterally bendable reinforcement. Preferably, the ends 24 and 25 are of sufficient length to extend radially outward beyond the center of the tire body so as to impart increased resistance to lateral deformation to a larger portion of the tire. The central portions of the reinforcing cords are wrapped around the core as indicated at 26, so as to be firmly anchored thereto, thus preventing the cords from being drawn radially outward an excessive amount under severe stresses imposed upon the tire.

In the embodiment of the invention shown in Figs. 1 and 2, the reinforcing element 23 is completely annular in extent and is continuous about the entire circumferential length of the core 20. The individual cords thereof are preferably diagonally disposed so that the end portions 24 are arranged crosswise of the end portions 25. This arrangement permits limited yielding or deformation of the reinforcing element without objectionable internal frictional effects in the reinforcing member.

Figs. 3 through 5 illustrate modifications of the invention in which several arrangements for the use of tab-like reinforcing elements are shown. At A, Fig. 4, individual cords 27 of the tab reinforcing element are arranged radially in approximately side by side parallel relation. Accordingly, the individual strands or cords do not cross one another and the device limits radial deformation of the body 12 of the tire to a minimum.

At B, Fig. 5, individual cords 28 are disposed diagonally with respect to one another similarly to the manner in which the cords shown in the reinforcing element of Figs. 1 and 2 are arranged. Thus the tab-like reinforcement shown at B permits substantial radial deformation of the tire and allows a greater amount of lateral displacement than the arrangement shown at A. The reinforcing tabs of the character shown at C, Fig. 3, are formed by woven fabric having cords interlocked with one another and arranged diagonally so as to permit slight deformation of the tab. Reinforcing elements formed of continuous circumferential strips having the individual cords thereof arranged as shown at A and C might be used similarly to the reinforcing elements shown in Figs. 1 and 2, which indicates the character of structure resulting when the cord arrangement shown at B is formed into a completely circumferential reinforcing element.

One of the important features of the present invention is the provision of the reinforcing element 23, which, by being anchored to the inextensible bead 20, is enabled to resist excessive deformation throughout the larger part of the body 12. Tires of the character shown in the drawing are frequently employed on factory supply trucks and the like. In applications of this character where the tires are subjected to extreme thrust loads along the axis of rotation of the wheel, there is a marked tendency for solid rubber tires to roll or become dislodged from the rim of the wheel. The reinforcing element or elements 23, while being firmly bonded to the rubber of the body 12 through vulcanization in the curing of the tire, are sufficiently removed from the outer portions and surface of the tire to permit these remote portions a large proportion of their inherent elasticity and resiliency. Furthermore, the reinforcing element or elements 23 tie the inner and outer portions of the tire together in a radial direction so that resistance is afforded against the outer and inner portions being rent asunder.

The principles of the present invention may be utilized in various ways, numerous modifications and alterations being contemplated, substitution of parts and changes in construction being resorted to as desired, it being understood that the embodiments shown in the drawing and described above are given merely for purposes of explanation and illustration without intending to limit the scope of the claims to the specific details disclosed.

What I claim is:

1. A tire comprising a substantially solid rubber annular cushion body having an outwardly directed peripheral road engaging surface and an inner edge formed to be received on a wheel rim, an inextensible core embedded in the body adjacent the inner edge thereof, and reinforcing cord fabric material disposed about the core and having radial portions which extend toward said surface from the core, said portions being disposed in side by side contacting relation to one another.

2. A tire comprising a substantially solid rubber cushion body, an inextensible circular core embedded in the body and reinforcing cords disposed about the core, said cords having portions which extend outwardly from both sides of the core and are disposed against one another in a plane between the sides of the core and midway between the side walls of the body.

3. In a wheel construction, a rim having spaced flanges to provide a tire receiving channel extending around the wheel periphery, a solid rubber tire in the channel, an inextensible circular core embedded in the tire approximately midway between the flanges, and reinforcing cords embracing the core and having ends extending radially from opposite sides of the core, said cord ends from the opposite sides of the core being disposed against one another to form a single radial flap embedded in the rubber body approximately midway between the wheel flanges, said flap and core constituting the sole radial and circumferential reinforcement for the tire.

4. In a wheel construction, a rim having spaced peripheral flanges to provide an annular tire receiving channel therebetween, a substantially solid rubber tire body of annular form in the channel, an inextensible circular core having an outer diameter approximating that of the flanges embedded in the tire body and having inner and outer peripheral surfaces, the inner surface being spaced from the rim by a section of the rubber body, and a cord reinforced flap having connection with the core and extending radially from approximately the middle of the outer peripheral surface of the core.

5. In a wheel construction, a rim having spaced peripheral flanges to provide an annular tire receiving channel therebetween, a substantially solid rubber tire body of annular form in the channel, said tire being of greater radial depth than axial thinness and having side walls which extend axially beyond the flanges, an inextensible circular core embedded in the tire body and disposed between the flanges, and reinforcing cords wrapped about the core and formed into a single flap which extends radially from the central part of the core beyond the flanges and more than half way through the radial depth of the tire, said core and the cords wrapped thereabout being separated from the rim by a section of the rubber body, and constituting the sole radial and circumferential reinforcement for the tire.

6. In a wheel construction, a rim having spaced parallel radial flanges providing a tire receiving channel extending around the wheel periphery, a solid rubber tire in the channel and extending radially beyond the edges of the flanges a distance several times the radial extent of the flanges, a single inextensible circular core embedded in the tire approximately midway between the flanges, and reinforcing cords embracing the core and extending outwardly therefrom, said core and cords being wholly embedded in the rubber of the tire and separated thereby from the rim, the cords extending from opposite sides of the core being disposed against one another to provide a single radial flap extending from the middle of the core, said core and flap constituting the sole radial and circumferential reinforcement for the rubber tire, the outer diameter of the core approximating that of the flanges, and the outermost ends of the cords extending well beyond the midsection of the tire.

GLENN H. ORR.

CERTIFICATE OF CORRECTION.

Patent No. 2,277,604.  March 24, 1942.

GLENN H. ORR.

It is hereby certified that error appears in the printed specification of the above numbered patent requiring correction as follows: Page 2, second column, line 70, claim 5, for "thinness" read --thickness--; and that the said Letters Patent should be read with this correction therein that the same may conform to the record of the case in the Patent Office.

Signed and sealed this 2nd day of June, A. D. 1942.

Henry Van Arsdale,
Acting Commissioner of Patents.

(Seal)